United States Patent
Sato

(10) Patent No.: US 10,300,605 B2
(45) Date of Patent: May 28, 2019

(54) ROBOT, CONTROLLER, AND ROBOT SYSTEM

(71) Applicant: Seiko Epson Corporation, Tokyo (JP)

(72) Inventor: Daisuke Sato, Matsumoto (JP)

(73) Assignee: Seiko Epson Corporation (JP)

( * ) Notice: Subject to any disclaimer, the term of this patent is extended or adjusted under 35 U.S.C. 154(b) by 214 days.

(21) Appl. No.: 15/372,733

(22) Filed: Dec. 8, 2016

(65) Prior Publication Data

US 2017/0165838 A1   Jun. 15, 2017

(30) Foreign Application Priority Data

Dec. 9, 2015   (JP) ................................. 2015-239954

(51) Int. Cl.
   *B25J 9/16*   (2006.01)
   *B25J 13/08*   (2006.01)

(52) U.S. Cl.
   CPC ............ *B25J 9/1694* (2013.01); *B25J 9/161* (2013.01); *B25J 13/085* (2013.01); *B25J 13/088* (2013.01); *G05B 2219/34242* (2013.01)

(58) Field of Classification Search
   CPC ........ B25J 9/1694; B25J 9/161; B25J 13/085; B25J 13/088; G05B 2219/34242
   USPC .................................................. 700/245, 258
   See application file for complete search history.

(56) References Cited

U.S. PATENT DOCUMENTS

| | | | | |
|---|---|---|---|---|
| 4,132,937 A | * | 1/1979 | Engelberger | B25J 9/161 318/568.1 |
| 4,385,358 A | * | 5/1983 | Ito | G05B 19/425 318/573 |
| 4,743,819 A | * | 5/1988 | Hashizume | B25J 9/0081 318/368 |
| 4,897,586 A | * | 1/1990 | Nakata | G05B 19/42 318/568.16 |
| 4,967,127 A | * | 10/1990 | Ishiguro | B25J 13/085 318/570 |
| 4,973,215 A | * | 11/1990 | Karlen | B25J 9/04 414/729 |
| 5,222,198 A | * | 6/1993 | Yamamoto | B25J 9/046 318/568.15 |
| 5,247,292 A | * | 9/1993 | Nakanishi | G08C 15/12 340/10.34 |
| 5,625,353 A | | 4/1997 | Katagiri et al. | |
| 5,767,648 A | * | 6/1998 | Morel | B25J 9/1628 318/568.1 |
| 6,091,219 A | | 7/2000 | Maruo et al. | |

(Continued)

FOREIGN PATENT DOCUMENTS

| | | |
|---|---|---|
| JP | 05-080848 A | 4/1993 |
| JP | 05-134724 A | 6/1993 |

(Continued)

*Primary Examiner* — Jaime Figueroa

(74) *Attorney, Agent, or Firm* — Harness, Dickey & Pierce, P.L.C.

(57) ABSTRACT

A robot is controlled by a control unit. The robot includes: a first sensor; a second sensor; a third sensor; a fourth sensor; a first circuit capable of transmitting and receiving signals to and from the first sensor and the second sensor; and a second circuit capable of transmitting and receiving signals to and from the third sensor and the fourth sensor. The control unit and the first circuit are connected through a first serial wire, and the first circuit and the second circuit are connected through a second serial wire.

12 Claims, 5 Drawing Sheets

(56) References Cited

U.S. PATENT DOCUMENTS

| | | | | |
|---|---|---|---|---|
| 7,979,157 B2* | 7/2011 | Anvari | ................. | A61G 13/10 |
| | | | | 700/245 |
| 8,036,776 B2* | 10/2011 | Hellberg | ............... | B25J 9/1674 |
| | | | | 700/245 |
| 2005/0166413 A1* | 8/2005 | Crampton | ............ | B25J 13/088 |
| | | | | 33/503 |
| 2006/0149418 A1* | 7/2006 | Anvari | ................. | A61G 13/10 |
| | | | | 700/245 |
| 2007/0219666 A1* | 9/2007 | Filippov | ................. | B60T 7/22 |
| | | | | 700/245 |
| 2009/0055019 A1* | 2/2009 | Stiehl | .................... | B25J 9/1671 |
| | | | | 700/249 |
| 2012/0167684 A1* | 7/2012 | Hwang | ............... | G06F 3/0346 |
| | | | | 73/510 |
| 2015/0127147 A1 | 5/2015 | Yamazaki et al. | | |

FOREIGN PATENT DOCUMENTS

| | | |
|---|---|---|
| JP | 06-039383 U | 5/1994 |
| JP | 06-208410 A | 7/1994 |
| JP | 11-175118 A | 7/1999 |
| JP | 2005-349493 A | 12/2005 |
| JP | 2015-085482 A | 5/2015 |
| JP | 2015-089577 A | 5/2015 |

* cited by examiner

ROBOT, CONTROLLER, AND ROBOT SYSTEM

BACKGROUND

1. Technical Field

The present invention relates to a robot, a controller, and a robot system.

2. Related Art

In the related art, a robot system including a robot that includes a robot arm and a controller that controls the robot has been known. The robot arm includes a plurality of arms (arm members) coupled with one another through joints, and, for example, a hand is attached as an end effector to the arm on the distal-most end side (the downstream-most side). The joints are driven by motors, and the arm rotates by the driving of the joint. Then, the robot grips, for example, an object with the hand, moves the object to a predetermined place, and performs predetermined work such as assembly.

Moreover, each of the motors is provided with an encoder that detects the rotation angle of the motor. A dedicated signal line (wire) is connected to each of the encoders, and the signal lines are connected to the controller. The controller controls the robot arm based on detection results of the encoders.

JP-A-11-175118 discloses a controller of a robot in which a plurality of encoders provided in a robot arm are connected in a multidrop manner on a common serial bus. In this controller, the number of signal lines with respect to the encoders can be reduced.

However, since the number of encoders and the number of signal lines are the same as each other in the robot in the related art and the number of signal lines is large, the robot arm becomes thick. This leads to a problem of increasing the size of the robot and increasing the weight thereof.

Moreover, in the controller disclosed in JP-A-11-175118, multiplexing of the encoder and a different sensor such as an angular velocity sensor is not performed. For this reason, when a different sensor is provided in the robot arm, the number of signal lines increases and thus the robot arm becomes thick. This leads to a problem of increasing the size of the robot and increasing the weight thereof.

SUMMARY

An advantage of some aspects of the invention is to solve at least a part of the problems described above, and the invention can be implemented as the following aspects or application examples.

A robot according to an aspect of the invention is a robot that is controlled by a control unit, and includes: a first sensor; a second sensor; a third sensor; a fourth sensor; a first circuit capable of transmitting and receiving signals to and from the first sensor and the second sensor; and a second circuit capable of transmitting and receiving signals to and from the third sensor and the fourth sensor, wherein the control unit and the first circuit are connected through a first serial wire, and the first circuit and the second circuit are connected through a second serial wire.

With this configuration, the number of signal lines between the control unit and the first circuit and between the first circuit and the second circuit can be reduced. Moreover, another sensor can be added without increasing the number of signal lines between the control unit and the first circuit and between the first circuit and the second circuit. With this configuration, the robot arm of the robot can be made thin, and the robot can be reduced in size and weight.

In the robot according to the aspect of the invention, it is preferable that the first circuit multiplexes signals of the first sensor and the second sensor, and that the second circuit multiplexes signals of the third sensor and the fourth sensor.

With this configuration, the number of signal lines between the control unit and the first circuit and between the first circuit and the second circuit can be reduced.

In the robot according to the aspect of the invention, it is preferable that each of the first sensor, the second sensor, the third sensor, and the fourth sensor is at least one of a position sensor, an inertial sensor, and a force sensor.

With this configuration, the driving of the robot can be accurately controlled.

In the robot according to the aspect of the invention, it is preferable that the robot further includes a first arm and a second arm, that the first sensor is a position sensor that detects a position of the first arm, and that the third sensor is a position sensor that detects a position of the second arm.

With this configuration, the driving of the robot can be accurately controlled.

In the robot according to the aspect of the invention, it is preferable that the robot further includes a plurality of arms, and that the first sensor and the second sensor are position sensors that detect a position of a same arm of the plurality of arms.

With this configuration, the driving of the robot can be accurately controlled.

In the robot according to the aspect of the invention, it is preferable that the robot further includes a drive unit that drives the same arm and a reducer that reduces a speed of the drive unit, that the first sensor is provided on an input shaft side of the reducer, and that the second sensor is provided on an output shaft side of the reducer.

With this configuration, the driving of the robot can be accurately controlled.

In the robot according to the aspect of the invention, it is preferable that the robot further includes a fifth sensor, that the first circuit is capable of transmitting and receiving a signal to and from the fifth sensor, and that the fifth sensor is a force sensor provided in the same arm.

With this configuration, the fifth sensor detects force or torque, and the robot can be controlled based on the detection result.

In the robot according to the aspect of the invention, it is preferable that the first circuit includes an identifier adding unit that adds an identifier containing information indicating a type of the first sensor to a signal.

With this configuration, the type of the first sensor can be known based on the information.

In the robot according to the aspect of the invention, it is preferable that the identifier contains information indicating a priority of a signal output from the first sensor.

With this configuration, the transmission order of the signal output from the first sensor can be decided according to the priority of the signal output from the first sensor.

In the robot according to the aspect of the invention, it is preferable that the robot further includes a transmission order deciding unit that decides transmission order of the signal according to the priority.

With this configuration, the transmission order of the signal output from the first sensor can be accurately decided.

A controller according to an aspect of the invention controls the robot according to the aspect of the invention and includes the control unit.

With this configuration, the number of signal lines between the control unit and the first circuit and between the first circuit and the second circuit can be reduced. Moreover, another sensor can be added without increasing the number of signal lines between the control unit and the first circuit and between the first circuit and the second circuit. With this configuration, the robot arm of the robot can be made thin, and the robot can be reduced in size and weight.

A robot system according to an aspect of the invention includes: the robot according to the aspect of the invention; and a controller controlling the robot and including the control unit.

With this configuration, the number of signal lines between the control unit and the first circuit and between the first circuit and the second circuit can be reduced. Moreover, another sensor can be added without increasing the number of signal lines between the control unit and the first circuit and between the first circuit and the second circuit. With this configuration, the robot arm of the robot can be made thin, and the robot can be reduced in size and weight.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
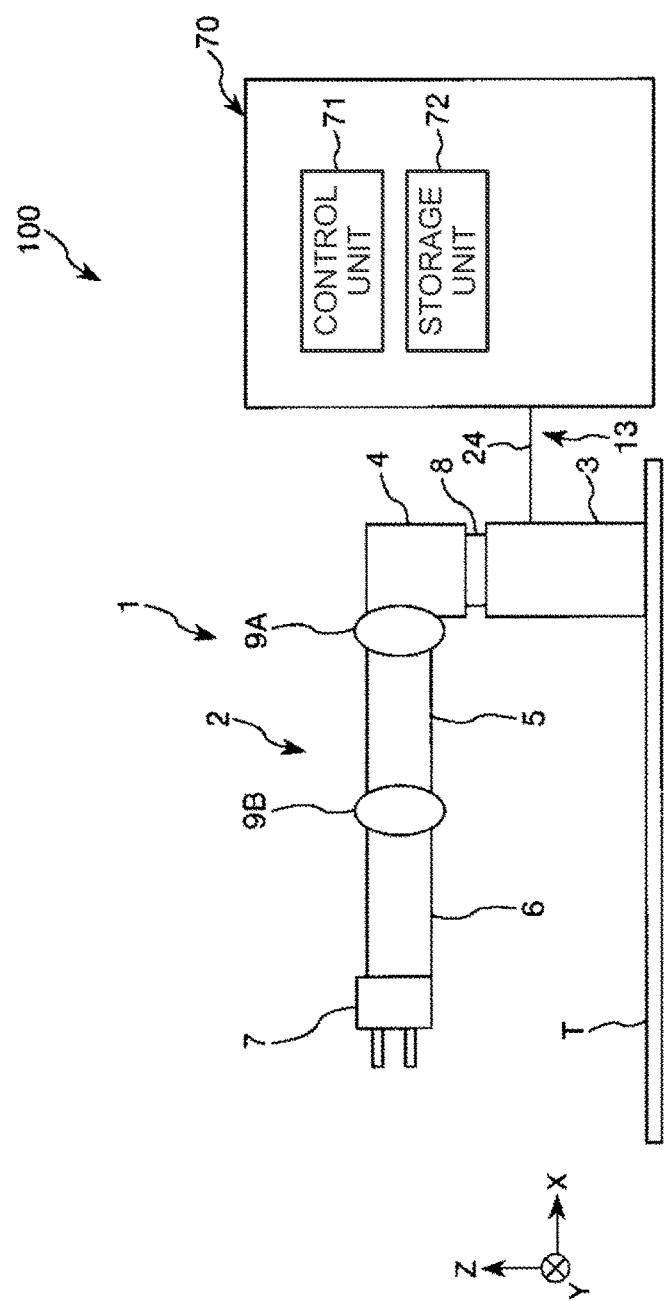
FIG. 1 is a side view showing a schematic configuration of a first embodiment of a robot system according to the invention.

Hereinafter, a robot, a controller, and a robot system according to the invention will be described in detail based on preferred embodiments shown in the accompanying drawings.

The invention is not limited to the embodiments below but can be implemented through appropriate modifications within the scope not changing the gist of the invention. Moreover, in the drawings used in the following description, components may be schematically shown for the sake of clarity of each of the components, and some of the components may be shown in different dimension scales.

First Embodiment

Figure 2:
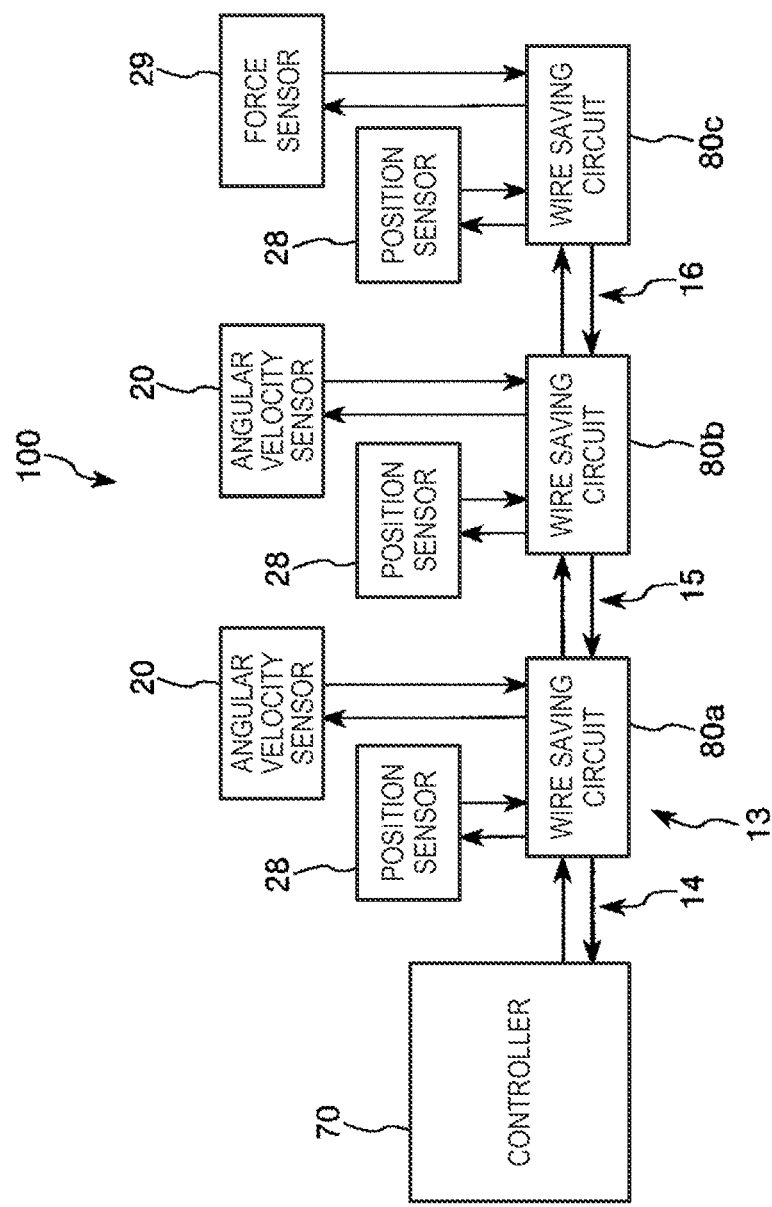
FIG. 2 is a block diagram showing a wiring unit of the robot system shown in FIG. 1.
Figure 3:
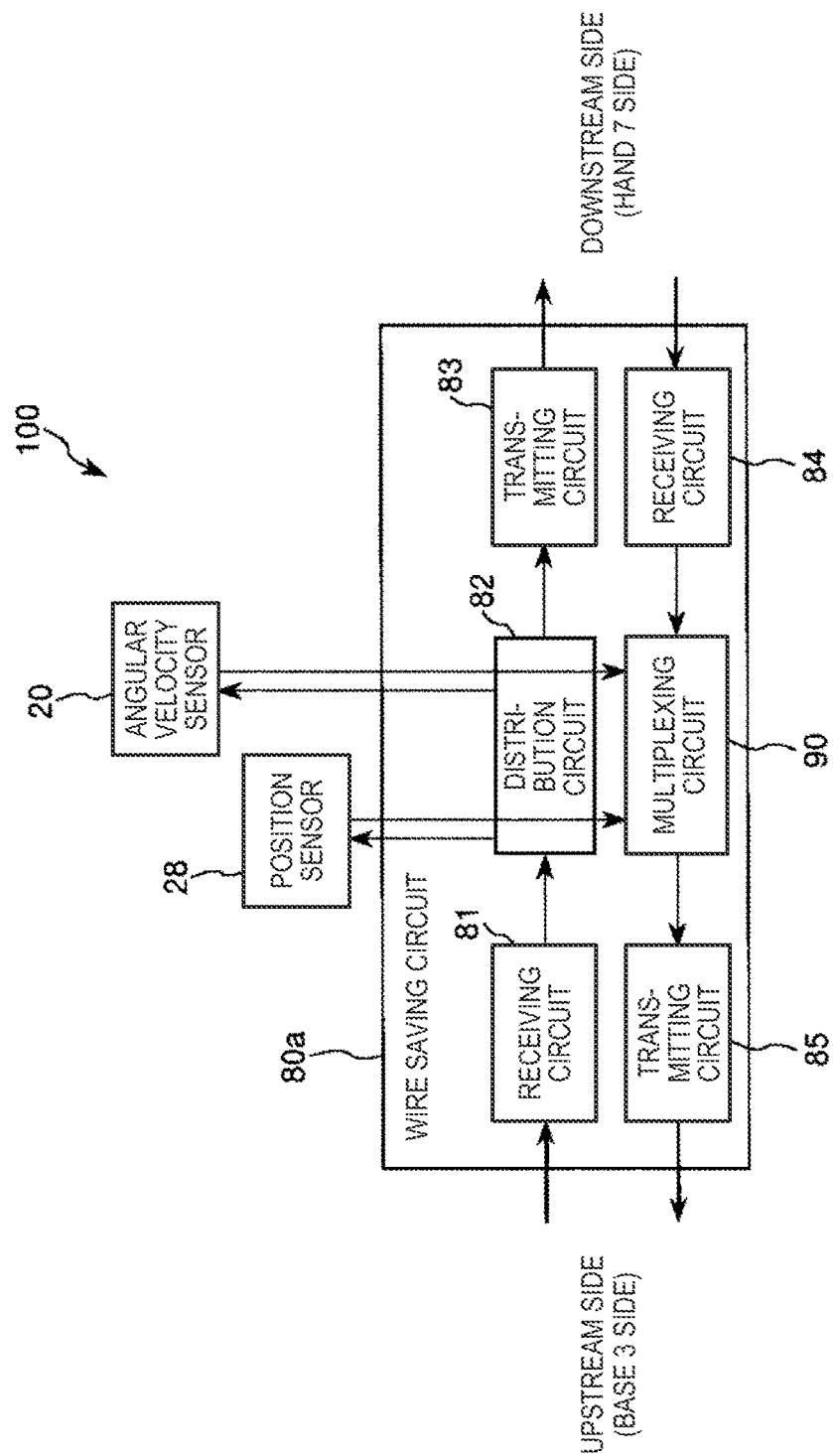
FIG. 3 is a block diagram showing a wire saving circuit of the robot system shown in FIG. 1.
Figure 4:
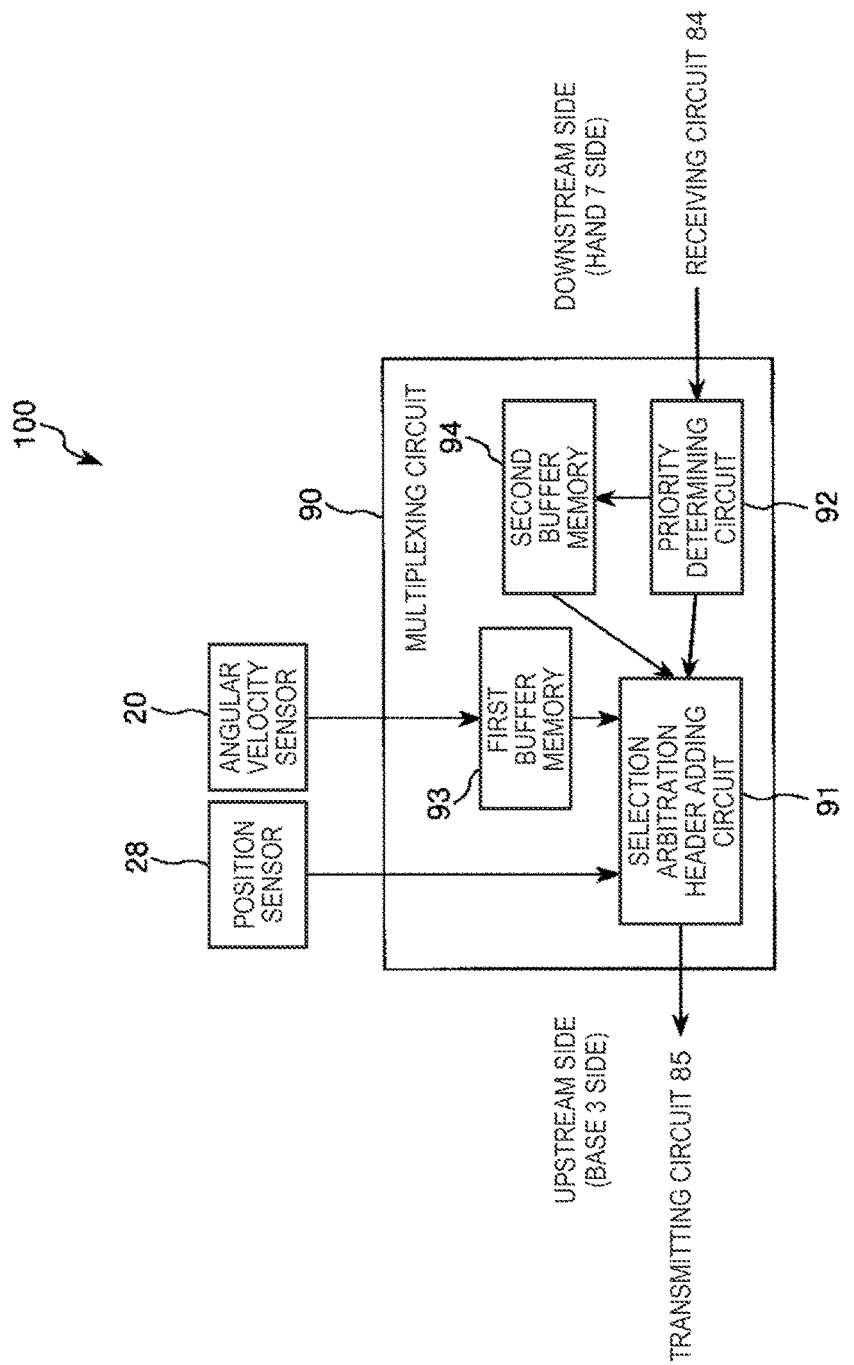
FIG. 4 is a block diagram showing a multiplexing circuit of the robot system shown in FIG. 1.

FIG. 1 is a side view showing a schematic configuration of a first embodiment of a robot system according to the invention. FIG. 2 is a block diagram showing a wiring unit of the robot system shown in FIG. 1. FIG. 3 is a block diagram showing a wire saving circuit of the robot system shown in FIG. 1. FIG. 4 is a block diagram showing a multiplexing circuit of the robot system shown in FIG. 1.

In the following, for convenience of description, the upper side in FIG. 1 is referred to as "up" or "upward", and the lower side is referred to as "down" or "downward". The base side in FIG. 1 is referred to as "proximal end" or "upstream", and the opposite side (hand side) is referred to as "distal end" or "downstream". The up-and-down direction in FIG. 1 is the vertical direction.

Moreover, in the following, an XYZ orthogonal coordinate system is set in FIG. 1, and the positional relationships among members will be described with reference to the XYZ orthogonal coordinate system. Specifically, the left-and-right direction in FIG. 1 is defined as an X-axis direction; a direction orthogonal to the paper surface in FIG. 1 is defined as a Y-axis direction; and the up-and-down direction in FIG. 1 is defined as a Z-axis direction. Moreover, directions around the X-axis, the Y-axis, and the Z-axis are respectively defined as a θX-direction, a θY-direction, and a θZ-direction.

As shown in FIG. 1, the robot system 100 includes a robot 1 and a controller (robot controller) 70 that controls the actuation (driving) of the robot 1. The robot system 100 can be used in, for example, a manufacturing process for manufacturing precision instrument such as a wristwatch. Moreover, the robot system 100 can perform, for example, work such as material feeding, material removing, conveying, and assembly of the precision instrument or the parts constituting the precision instrument.

The controller 70 includes a control unit 71 that controls the robot 1 and a storage unit 72. The controller 70 controls the actuation of the robot 1 based on detection results of position sensors 28, angular velocity sensors 20, and a force sensor 29 (theses sensors will be described later). The controller 70 also performs vibration suppression control for the robot 1 based on detection results of a predetermined position sensor of the position sensors 28 and a predetermined angular velocity sensor of the angular velocity sensors 20. The controller 70 can be composed of, for example, a personal computer (PC) or the like. Programs for controlling the robot 1 are previously stored in the storage unit 72. The controller 70 may be built in the robot 1 or may be provided separately from the robot 1; in the embodiment, however, the controller 70 is provided separately from the robot 1.

The robot 1 is a vertical articulated robot and includes a base (support portion) 3 and a robot arm 2. The robot arm 2 includes a first arm 4 as a torso, a second arm 5, and a third arm 6. A hand 7 as an end effector is detachably coupled (mounted) to the distal end of the third arm 6.

The base 3 is installed on an installation surface T. The first arm 4 is coupled (provided) on the base 3 through a first joint 8. A first drive mechanism that rotates (drives) the first arm 4 in the θZ-direction with respect to the base 3 is provided (not shown in FIG. 1) in the interior of the first joint 8. The second arm 5 is coupled to the side surface of the first arm 4 through a second joint 9A. A second drive mechanism that rotates (drives) the second arm 5 in the θY-direction with respect to the first arm 4 is provided (not shown in FIG. 1) in the interior of the second joint 9A. The third arm 6 is coupled to the distal end of the second arm 5 through a third joint 9B. A third drive mechanism that rotates (drives) the third arm 6 in the θY-direction with respect to the second arm 5 is provided (not shown in FIG. 1) in the interior of the third joint 9B. The hand 7 is detachably coupled to the distal end of the third arm 6.

Each of the first drive mechanism, the second drive mechanism, and the third drive mechanism includes a motor (drive unit) and a reducer that reduces the rotational speed (speed) of the motor. The driving of each of the motors is controlled by the controller 70. The reducer may be omitted.

The robot 1 includes the position sensor (first sensor) 28 that detects the position of the first arm, the position sensor (third sensor) 28 that detects the position of the second arm 5, and the position sensor 28 that detects the position of the third arm 6 (see FIG. 2). Examples of each of the position sensors 28 include, for example, an encoder.

The position sensors 28 may be provided on the input shaft sides of the reducers of the first drive mechanism, the second drive mechanism, and the third drive mechanism, or may be provided on the output shaft sides of the reducers.

The first arm 4 is provided with the angular velocity sensor (second sensor) 20 as an inertial sensor, and the second arm 5 is provided with the angular velocity sensor (fourth sensor) 20 as an inertial sensor (see FIG. 2). For example, an acceleration sensor or the like may be provided instead of the angular velocity sensor 20.

The third arm 6 is provided with the force sensor 29 (see FIG. 2). Examples of the force sensor 29 include, for example, a torque sensor and a force sense sensor.

When a torque sensor is used as the force sensor 29, the force sensor 29 is provided on, for example, the output shaft side of the reducer of the third drive mechanism.

The robot system 100 includes a wiring unit 13. The wiring unit 13 will be described in detail later.

In the robot 1 having the configuration described above, for example, the first arm 4 rotates in the θZ-direction with respect to the base 3, the second arm 5 rotates in the θY-direction with respect to the first arm 4, and the third arm 6 rotates in the θY-direction with respect to the second arm 5, so that various kinds of work can be performed while the hand 7 is moved and operated to any position.

Next, the wiring unit 13 will be described.

As shown in FIG. 2, the wiring unit 13 includes a wire saving circuit (first circuit) 80a, a wire saving circuit (second circuit) 80b, a wire saving circuit (third circuit) 80c, a first serial wire (first serial signal line) 14 that connects the control unit 71 of the controller 70 with the wire saving circuit 80a, a second serial wire (second serial signal line) 15 that connects the wire saving circuit 80a with the wire saving circuit 80b, and a third serial wire (third serial signal line) 16 that connects the wire saving circuit 80b with the wire saving circuit 80c. As described above, the control unit 71 of the controller 70 and the wire saving circuits 80a, 80b, and 80c are connected in series (daisy-chain connected) in this order from the upstream side toward the downstream side through the first serial wire 14, the second serial wire 15, and the third serial wire 16. A serial communication system is adopted as the communication system of the wiring unit 13. With this configuration, the number of signal lines of the wiring unit 13 can be reduced.

The serial communication system is not particularly limited, but a high-speed serial communication system is preferably used. Specifically, examples thereof include, for example, the Ethernet (registered trademark).

The position sensor 28 and the angular velocity sensor 20 are connected to the wire saving circuit 80a which is closest to the base 3 side. The wire saving circuit 80a is configured to be capable of transmitting and receiving signals to and from the position sensor 28 and the angular velocity sensor 20. The signal output from the position sensor 28 and the signal output from the angular velocity sensor 20 are multiplexed by a multiplexing circuit 90 (described later) of the wire saving circuit 80a and transmitted to the controller 70 through serial communication.

The position sensor 28 and the angular velocity sensor 20 are connected to the wire saving circuit 80b which is second from the base 3. The wire saving circuit 80b is configured to be capable of transmitting and receiving signals to and from the position sensor 28 and the angular velocity sensor 20. The signal output from the position sensor 28 and the signal output from the angular velocity sensor 20 are multiplexed by a multiplexing circuit 90 (described later) of the wire saving circuit 80b and transmitted to the controller 70 through serial communication.

The position sensor 28 and the force sensor 29 are connected to the wire saving circuit 80c which is third from the base 3, that is, which is disposed on the side opposite to the base 3. The wire saving circuit 80c is configured to be capable of transmitting and receiving signals to and from the position sensor 28 and the force sensor 29. The signal output from the position sensor 28 and the signal output from the force sensor 29 are multiplexed by a multiplexing circuit 90 (described later) of the wire saving circuit 80c and transmitted to the controller 70 through serial communication.

Next, the wire saving circuits 80a, 80b, and 80c will be described. However, since the wire saving circuits are similar to each other, the wire saving circuit 80a closest to the base 3 side will be representatively described below.

As shown in FIG. 3, the wire saving circuit 80a includes a receiving circuit 81, a distribution circuit 82, a transmitting circuit 83, a receiving circuit 84, the multiplexing circuit 90, and a transmitting circuit 85.

The receiving circuit 81, the distribution circuit 82, and the transmitting circuit 83 are connected in series in this order from the base 3 side.

The receiving circuit 84, the multiplexing circuit 90, and the transmitting circuit 85 are connected in series in this order from the side opposite to the base 3.

The position sensor 28 is connected to the distribution circuit 82 and the multiplexing circuit 90. Similarly, the angular velocity sensor 20 is connected to the distribution circuit 82 and the multiplexing circuit 90.

The distribution circuit 82 has the function of distributing a signal (e.g., a request signal to request a signal, etc.) transmitted from the controller 70 to the position sensor 28, the angular velocity sensor 20, and the transmitting circuit 83, that is, the function of sending (outputting) the signal to any one of the position sensor 28, the angular velocity sensor 20, and the transmitting circuit 83. Specifically, the distribution circuit 82 determines whether the signal transmitted from the controller 70 is a signal to be input to the position sensor 28, a signal to be input to the angular velocity sensor 20, or a signal to be input to the wire saving circuit 80b or 80c on the downstream side of the wire saving circuit 80a. The signal to be input to the position sensor 28 is sent to the position sensor 28; the signal to be input to the angular velocity sensor 20 is sent to the angular velocity sensor 20; and the signal to be input to the wire saving circuit 80b or 80c is sent to the transmitting circuit 83. Information of the destination of the signal is contained in a header (described later) added to the signal.

As shown in FIG. 4, the multiplexing circuit 90 includes a selection arbitration header adding circuit (identifier adding unit) 91, a priority determining circuit 92, a first buffer memory 93, and a second buffer memory 94. The selection arbitration header adding circuit 91 and the priority determining circuit 92 constitute a transmission order deciding unit that decides the transmission order of the signal to be transmitted.

The priority determining circuit 92 and the selection arbitration header adding circuit 91 are connected in series in this order from the side opposite to the base 3.

The priority determining circuit 92 is connected to the second buffer memory 94, and the second buffer memory 94 is connected to the selection arbitration header adding circuit 91.

The angular velocity sensor 20 is connected to the first buffer memory 93, and the first buffer memory 93 is connected to the selection arbitration header adding circuit 91.

The position sensor 28 is connected to the selection arbitration header adding circuit 91.

The selection arbitration header adding circuit 91 has the function of selecting one signal from a plurality of input signals and outputting the signal, the function of determining the priority (priority order) of the signal to be transmitted, and the function of adding a header (identifier) to the signal.

The header contains information such as, for example, the type of each of the sensors, the priority of the signal to be transmitted, the source of the signal to be transmitted, and the destination of the signal to be transmitted. Examples of the type of the sensor include, for example, the kind, manufacturer, and model number of the sensor. For example, the selection arbitration header adding circuit 91 adds a header to the beginning (head) portion of a signal and adds a footer to the end portion thereof, and thus the signal is packetized.

Among the signal output from the position sensor 28, the signal output from the angular velocity sensor 20, and the signal output from the force sensor 29, the signal output from the position sensor 28 has the first (highest) priority, the signal output from the angular velocity sensor 20 has the second priority, and the signal output from the force sensor 29 has the third priority.

When a plurality of signals are input, the selection arbitration header adding circuit 91 preferentially sends a signal having a higher priority to the upstream side, that is, to the controller 70. Then, the selection arbitration header adding circuit 91 transmits a signal having a lower priority in the interval between transmissions of data having higher priorities.

That is, when the signal output from the position sensor 28 and the signal output from the angular velocity sensor 20 are input, the selection arbitration header adding circuit 91 first sends the signal output from the position sensor 28 and sends the signal output from the angular velocity sensor 20 later. The signal output from the angular velocity sensor 20 is stored in the first buffer memory 93.

Moreover, when a signal transmitted from the downstream side, that is, from the wire saving circuit 80b, and at least one of the signal output from the position sensor 28 and the signal output from the angular velocity sensor 20 are input, the selection arbitration header adding circuit 91 similarly selects the signal having the highest priority and sends the signal to the controller 70.

Moreover, when the signal transmitted from the wire saving circuit 80b and the signal output from the position sensor 28 are input and the priorities of the signals are the same as each other, the selection arbitration header adding circuit 91 selects the signal transmitted from the wire saving circuit 80b and outputs the signal. Similarly, when the signal transmitted from the wire saving circuit 80b and the signal output from the angular velocity sensor 20 are input and the priorities of the signals are the same as each other, the selection arbitration header adding circuit 91 selects the signal transmitted from the wire saving circuit 80b and outputs the signal. This is because since the transmission speed of the signal transmitted from the wire saving circuit 80b is higher than that of the signal output from the position sensor 28 or the angular velocity sensor 20, communication time can be shortened by preferentially transmitting the signal transmitted from the wire saving circuit 80b.

The priority determining circuit 92 has the function of determining the priority of a signal to be transmitted. That is, the priority determining circuit 92 determines the priority of a signal transmitted from the downstream side, that is, from the wire saving circuit 80b, and sends, for example, a signal having the highest priority, that is, the signal of the position sensor 28 transmitted from the wire saving circuit 80b to the selection arbitration header adding circuit 91, and a signal having a lower priority than that of the position sensor 28 to the selection arbitration header adding circuit 91 and the second buffer memory 94. The signal having the lower priority is stored in the second buffer memory 94.

Next, transmission of signals in the wiring unit 13 will be described.

As shown in FIG. 2, in communication between the controller 70, and the position sensor 28 and the force sensor 29 connected to the wire saving circuit 80c, a signal that is transmitted from the controller 70 to the position sensor 28 is transmitted from the controller 70 successively to the wire saving circuit 80a, the wire saving circuit 80b, and the wire saving circuit 80c by the serial communication system, and then, the signal is transmitted from the wire saving circuit 80c to the position sensor 28.

Similarly, a signal that is transmitted from the controller 70 to the force sensor 29 is transmitted from the controller 70 successively to the wire saving circuit 80a, the wire saving circuit 80b, and the wire saving circuit 80c by the serial communication system, and then, the signal is transmitted from the wire saving circuit 80c to the force sensor 29.

Moreover, a signal that is transmitted from the position sensor 28 to the controller 70 is transmitted from the position sensor 28 to the wire saving circuit 80c, and then transmitted from the wire saving circuit 80c successively to the wire saving circuit 80b, the wire saving circuit 80a, and the controller 70 by the serial communication system.

Similarly, a signal that is transmitted from the force sensor 29 to the controller 70 is transmitted from the force sensor 29 to the wire saving circuit 80c, and then transmitted from the wire saving circuit 80c successively to the wire saving circuit 80b, the wire saving circuit 80a, and the controller 70 by the serial communication system.

In the multiplexing circuit 90, the processing described above is performed.

In communication between the controller 70, and the position sensor 28 and the angular velocity sensor 20 connected to the wire saving circuit 80b, a signal that is transmitted from the controller 70 to the position sensor 28 is transmitted from the controller 70 successively to the wire saving circuit 80a and the wire saving circuit 80b by the serial communication system, and then transmitted from the wire saving circuit 80b to the position sensor 28.

Similarly, a signal that is transmitted from the controller 70 to the angular velocity sensor 20 is transmitted from the controller 70 successively to the wire saving circuit 80a and the wire saving circuit 80b by the serial communication system, and then transmitted from the wire saving circuit 80b to the angular velocity sensor 20.

Moreover, a signal that is transmitted from the position sensor 28 to the controller 70 is transmitted from the position sensor 28 to the wire saving circuit 80b, and then transmitted from the wire saving circuit 80b successively to the wire saving circuit 80a and the controller 70 by the serial communication system.

Similarly, a signal that is transmitted from the angular velocity sensor 20 to the controller 70 is transmitted from the angular velocity sensor 20 to the wire saving circuit 80b, and then transmitted from the wire saving circuit 80b successively to the wire saving circuit 80a and the controller 70 by the serial communication system.

In the multiplexing circuit 90, the processing described above is performed.

In communication between the controller 70, and the position sensor 28 and the angular velocity sensor 20 connected to the wire saving circuit 80a, a signal that is transmitted from the controller 70 to the position sensor 28 is transmitted from the controller 70 to the wire saving circuit 80a by the serial communication system, and then transmitted from the wire saving circuit 80a to the position sensor 28.

Similarly, a signal that is transmitted from the controller 70 to the angular velocity sensor 20 is transmitted from the controller 70 to the wire saving circuit 80a by the serial communication system, and then transmitted from the wire saving circuit 80a to the angular velocity sensor 20.

Moreover, a signal that is transmitted from the position sensor 28 to the controller 70 is transmitted from the position sensor 28 to the wire saving circuit 80a, and then transmitted from the wire saving circuit 80a to the controller 70 by the serial communication system.

Similarly, a signal that is transmitted from the angular velocity sensor 20 to the controller 70 is transmitted from the angular velocity sensor 20 to the wire saving circuit 80a, and then transmitted from the wire saving circuit 80a to the controller 70 by the serial communication system.

In the multiplexing circuit 90, the processing described above is performed.

According to the robot system 100 as has been described above, the number of signal lines of the wiring unit 13 can be reduced. Moreover, another sensor can be added without increasing the number of signal lines. With this configuration, the robot arm 2 can be made thin, and the robot 1 can be reduced in size and weight.

The number of the position sensors 28 connected to the wire saving circuit 80a is not limited to one, and may be two or more. The number of the angular velocity sensors 20 connected to the wire saving circuit 80a is not limited to one, and may be two or more.

The number of the position sensors 28 connected to the wire saving circuit 80b is not limited to one, and may be two or more. The number of the angular velocity sensors 20 connected to the wire saving circuit 80b is not limited to one, and may be two or more.

The number of the position sensors 28 connected to the wire saving circuit 80c is not limited to one, and may be two or more. The number of the force sensors 29 connected to the wire saving circuit 80c is not limited to one, and may be two or more.

Moreover, another sensor may be connected to each of the wire saving circuits 80a, 80b, and 80c.

That is, for example, a force sensor or the like may be connected to each of the wire saving circuits 80a and 80b. Moreover, for example, an angular velocity sensor or the like may be connected to the wire saving circuit 80c.

Examples of the sensor other than the sensors described above include, for example, an electronic camera (imaging unit) and a temperature sensor that detects temperature. The priority of the electronic camera is lower than that of the force sensor 29, and the priority of the temperature sensor is lower than that of the force sensor 29.

Second Embodiment

Figure 5:
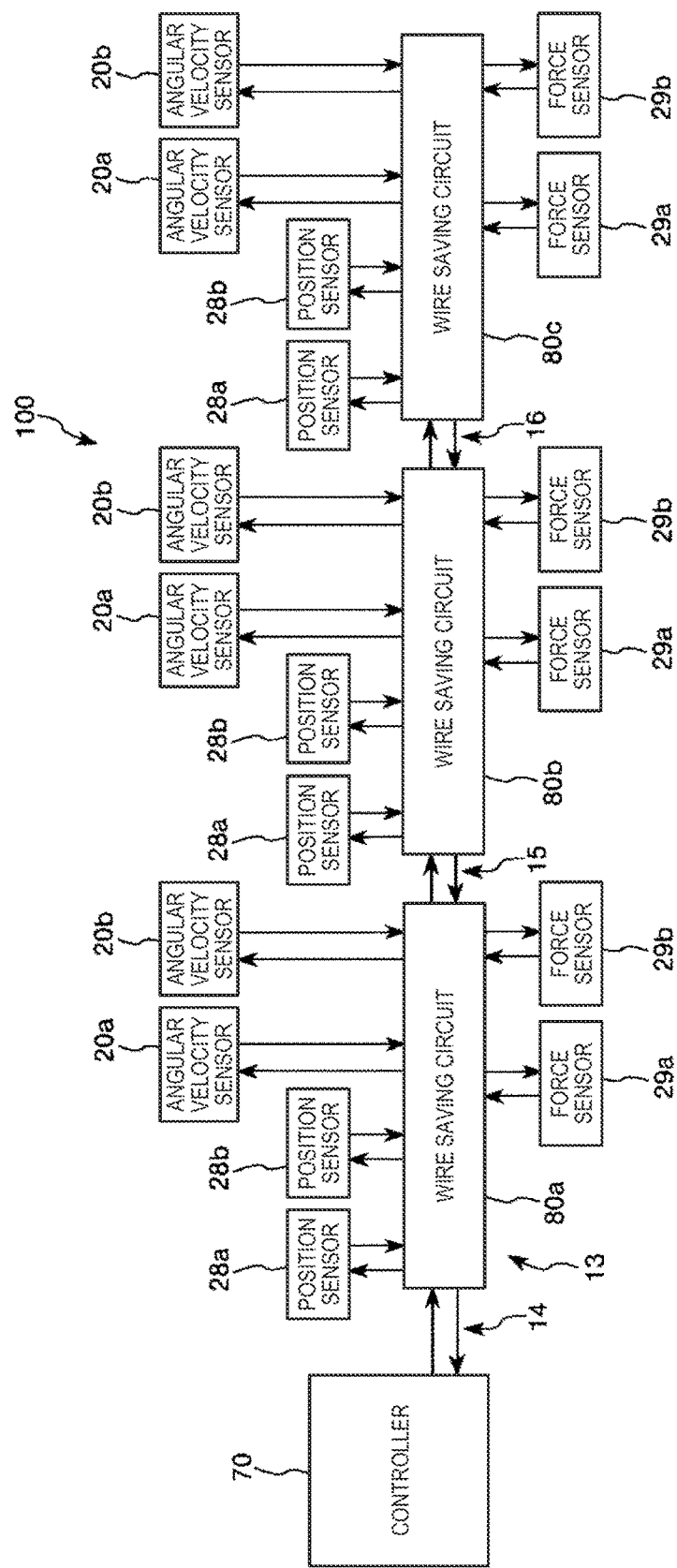
FIG. 5 is a block diagram showing a wiring unit in a second embodiment of the robot system according to the invention.

FIG. 5 is a block diagram showing a wiring unit in a second embodiment of the robot system according to the invention.

Hereinafter, the second embodiment will be described; however, the description focuses on differences from the first embodiment described above, and a description of similar matters is omitted.

As shown in FIG. 5, in the robot system 100 of the second embodiment, the robot 1 includes a position sensor (first sensor) 28a and a position sensor (second sensor) 28b that detect the position of the first arm 4, angular velocity sensors 20a and 20b provided in the first arm 4, and force sensors (fifth sensor) 29a and 29b provided in the first arm 4. The position sensors 28a and 28b, the angular velocity sensors 20a and 20b, and the force sensors 29a and 29b are connected to the wire saving circuit 80a. The wire saving circuit 80a is configured to be capable of transmitting and receiving signals to and from the sensors.

Moreover, the robot 1 includes position sensors 28a and 28b that detect the position of the second arm 5, angular velocity sensors 20a and 20b provided in the second arm 5, and force sensors 29a and 29b provided in the second arm 5. The position sensors 28a and 28b, the angular velocity sensors 20a and 20b, and the force sensors 29a and 29b are connected to the wire saving circuit 80b. The wire saving circuit 80b is configured to be capable of transmitting and receiving signals to and from the sensors.

Moreover, the robot 1 includes position sensors 28a and 28b that detect the position of the third arm 6, angular velocity sensors 20a and 20b provided in the third arm 6, and force sensors 29a and 29b provided in the third arm 6. The position sensors 28a and 28b, the angular velocity sensors 20a and 20b, and the force sensors 29a and 29b are connected to the wire saving circuit 80c. The wire saving circuit 80c is configured to be capable of transmitting and receiving signals to and from the sensors.

As described above, two sensors are provided for each kind of sensor; therefore, even when any one of the two sensors is broken, detection can be performed by the other sensor, and thus the robot 1 can be controlled.

Next, the arrangement of the position sensors 28a and 28b that detect the positions of the first arm 4, the second arm 5, and the third arm 6 will be described. However, since these sensors are similar to each other, the arrangement of the position sensors 28a and 28b that detect the position of the first arm 4 will be representatively described below.

The position sensor 28a is provided on the input shaft side of the reducer, and the position sensor 28b is provided on the output shaft side of the reducer. With this configuration, the position sensor 28a and the position sensor 28b can obtain different information, and thus the robot 1 can be accurately controlled. The position sensor 28a has a higher priority than the position sensor 28b.

Moreover, the position sensor 28a and the position sensor 28b may be made by the same manufacturer or may be made by different manufacturers; however, the position sensor 28a and the position sensor 28b are preferably made by different manufacturers. With this configuration, the probability that the position sensor 28a and the position sensor 28b are broken at the same time can be reduced.

Also according to the second embodiment described above, advantageous effects similar to those of the first embodiment described above can be provided.

Both the position sensor 28a and the position sensor 28b may be provided on the input shaft side of the reducer, or may be provided on the output shaft side of the reducer.

The number of sensors of the same kind (e.g., the position sensors) connected to the wire saving circuit 80a, the wire saving circuit 80b, and the wire saving circuit 80c is not limited to two, and may be three or more.

The robot, the controller, and the robot system according to the invention have been described above based on the embodiments shown in the drawings. However, the invention is not limited to the embodiments, and the configuration of each portion can be replaced with any configuration having a similar function. Moreover, any other configuration may be added.

Moreover, the invention may be configured by combining any two or more configurations (features) of the embodiments.

Although a signal is configured so as to be packetized in the embodiments, the invention is not limited to this. For example, a circuit to unify the formats of a plurality of signals may be provided.

Although the number of rotating axes of the robot arm (manipulator) is three in the embodiments, the invention is not limited to this. The number of rotating axes of the robot arm may be, for example, two, or four or more (e.g., six or seven). That is, although the number of arms (links) is three in the embodiments, the invention is not limited to this. The number of arms may be, for example, two, or four or more (e.g., six or seven).

Although the number of robot arms is one in the embodiments, the invention is not limited to this. The number of robot arms may be, for example, two or more. That is, the robot (robot main body) may be, for example, a multi-arm robot such as a dual-arm robot.

Although a hand is exemplified as an end effector in the embodiments, the invention is not limited to this. Examples of the end effector include, for example, a drill, a welding machine, and a laser radiator, in addition to the end effector.

Moreover, the robot may be another type of robot in the invention. Specific examples include, for example, a legged walking (running) robot including a leg portion and a SCARA robot.

The entire disclosure of Japanese Patent Application No. 2015-239954, filed Dec. 9, 2015 is expressly incorporated by reference herein.

What is claimed is:

1. A robot comprising:
   a controller;
   a base;
   a torso having a first arm, a second arm, and a third arm, the torso being connected to the base;
   a first position sensor;
   a second position sensor;
   a third position sensor;
   an inertial sensor;
   a force sensor;
   a first circuit for transmitting, receiving, and multiplexing signals to and from the first position sensor;
   a second circuit for transmitting, receiving, and multiplexing signals to and from the second position sensor and the inertial sensor; and
   a third circuit for transmitting, receiving, and multiplexing signals to and from the third position sensor and the force sensor, wherein
   the controller and the first circuit are connected through a first serial wire,
   the first circuit and the second circuit are connected through a second serial wire,
   the second circuit and the third circuit are connected through a third serial wire, and
   when the first arm, the second arm, and the third arm are disposed on the same straight line, the first circuit is disposed closer to the base than the second circuit and the third circuit, and the second circuit is disposed closer to the base than the third circuit.

2. The robot according to claim 1, wherein the force sensor is provided in the same arm as the first circuit.

3. The robot according to claim 1, wherein the first circuit includes a first identifier addition circuit configured to add an identifier containing sensor type information to a signal output from the first position sensor.

4. The robot according to claim 3, wherein the identifier contains transmission priority information for the signal output from the first position sensor.

5. The robot according to claim 4, further comprising a transmission circuit configured to determine transmission order of the signal according to the transmission priority.

6. The robot according to claim 1, further comprising:
   a first drive unit that drives the first arm; and
   a first reducer that reduces a speed of the first drive unit, wherein
   the first position sensor is provided on an input shaft of the first reducer,
   the second position sensor is provided on an output shaft of the first reducer, and
   the first position sensor and the second position sensor detect a position of the first arm.

7. The robot according to claim 1, further comprising:
   a second drive unit that drives the second arm; and
   a second reducer that reduces a speed of the second drive unit, wherein
   the first position sensor is provided on an input shaft of the second reducer,
   the second position sensor is provided on an output shaft of the second reducer, and
   the first position sensor and the second position sensor detect a position of the second arm.

8. The robot according to claim 1, further comprising:
   a third drive unit that drives the third arm; and
   a third reducer that reduces a speed of the third drive unit, wherein
   the second position sensor is provided on an input shaft of the third reducer,
   the third position sensor is provided on an output shaft of the third reducer, and
   the second position sensor and the third position sensor detect a position of the third arm.

9. The robot according to claim 1, wherein:
   the second circuit includes a second identifier addition circuit configured to add a first identifier to a signal output from the second position sensor and add a second identifier to a signal output from the inertial sensor, the first identifier including sensor type information and transmission priority information for the signal output from the second position sensor, and the second identifier including sensor type information and transmission priority information for the signal output from the inertial sensor, and
   the second circuit includes a transmission circuit configured to transmit the signal from the second position sensor and the signal from the inertial sensor according to the first identifier and the second identifier.

10. The robot according to claim 6, wherein:
    the second circuit includes a second identifier addition circuit configured to add a first identifier to a signal output from the second position sensor and add a second identifier to a signal output from the inertial sensor, the first identifier including sensor type information and transmission priority information for the signal output from the second position sensor, and the second identifier including sensor type information and transmission priority information for the signal output from the inertial sensor, and the second circuit includes a transmission circuit configured to transmit the signal from the second position sensor and the signal from the inertial sensor according to the first identifier and the second identifier.

11. The robot according to claim 7, wherein:

the second circuit includes a second identifier addition circuit configured to add a first identifier to a signal output from the second position sensor and add a second identifier to a signal output from the inertial sensor, the first identifier including sensor type information and transmission priority information for the signal output from the second position sensor, and the second identifier including sensor type information and transmission priority information for the signal output from the inertial sensor, and the second circuit includes a transmission circuit configured to transmit the signal from the second position sensor and the signal from the inertial sensor according to the first identifier and the second identifier.

12. The robot according to claim 8, wherein:

the second circuit includes a second identifier addition circuit configured to add a first identifier to a signal output from the second position sensor and add a second identifier to a signal output from the inertial sensor, the first identifier including sensor type information and transmission priority information for the signal output from the second position sensor, and the second identifier including sensor type information and transmission priority information for the signal output from the inertial sensor, and the second circuit includes a transmission circuit configured to transmit the signal from the second position sensor and the signal from the inertial sensor according to the first identifier and the second identifier.

* * * * *